United States Patent
Thomas

[15] 3,660,114
[45] May 2, 1972

[54] POULTRY FLAVOR COMPRISING AMINO ACIDS, SUGARS, VEGETABLE PROTEIN HYDROLYSATE AND 5'-RIBONUCLEOTIDES

[72] Inventor: Paul D. Thomas, Groton, Conn.
[73] Assignee: Pfizer, Inc., New York, N.Y.
[22] Filed: Apr. 12, 1967
[21] Appl. No.: 630,188

[52] U.S. Cl. ....................................................99/140 N
[51] Int. Cl. ............................................................A23l 1/26
[58] Field of Search..................................................99/140

[56] References Cited

UNITED STATES PATENTS

| | | | |
|---|---|---|---|
| 2,934,437 | 4/1960 | Morton et al. | 99/140 |
| 3,104,171 | 9/1963 | Sakaguchi et al. | 99/140 |
| 3,365,306 | 1/1968 | Perret | 99/140 |

OTHER PUBLICATIONS

Belikov et al., " Nature of Some Food Odors" Chemical Abstracts, 15339-d Volume 62, 1965
Pippen et al., " Chicken Broth Flavor and pH," Poultry Science, pp. 816– 824, Volume 44, 1965

Primary Examiner—Morris O. Wolk
Assistant Examiner—Warren Bovee
Attorney—Connolly and Hutz

[57] ABSTRACT

A method for preparing a synthetic chicken-flavored composition containing amino acids, sugars, vegetable protein hydrolysate, monosodium glutamate, edible fat and 5'-ribonucleotides.

5 Claims, No Drawings

POULTRY FLAVOR COMPRISING AMINO ACIDS, SUGARS, VEGETABLE PROTEIN HYDROLYSATE AND 5'-RIBONUCLEOTIDES

BACKGROUND OF THE INVENTION

This invention relates to a new and useful method for making flavoring compositions. More particularly, it is concerned with a process for the preparation of a synthetic chicken flavor comprising sugars, amino acids, vegetable protein hydrolysates, 5'-ribonucleotides, and monosodium glutamate, which is useful in imparting a chicken flavor to foods. The commercially-available chicken-flavor extracts used in flavoring foods such as gravies and soups are obtained by a time-consuming and generally expensive process. Most chicken-flavor extracts contain a dehydrated chicken meat along with various spices and fillers.

The price of the chicken-flavored extract tends to fluctuate with the season of the year and the competitive demand for poultry for table use. Similar fluctuations are observed in the quality of the extract. It has now been found that by use of the process of this invention, it is possible to obtain chicken-flavored extracts which have uniformly high quality at a cost that does not vary with the season or availability of poultry. This is accomplished by replacing the usual chicken-flavor extract with compositions prepared from commercially-available chemical and vegetable materials which are stable in price and some of which are expected to be available at steadily decreasing prices in the future.

I have surprisingly found that the synthetic chicken-flavor compositions of this invention have a taste and aroma of the natural chicken flavor and are suitable for flavoring gravies and soups. It is most important, in order to obtain a commercially-acceptable product, that every nuance and flavor note of natural poultry flavor be reproduced in a synthetic poultry flavor exactly as it is tasted and smelled in the natural product. While a beef-flavor extract can have a slightly stronger taste or a slightly saltier taste than natural beef flavor, a chicken flavor cannot and still be commercially acceptable. A chicken-flavored extract must have a certain mildness to be acceptable and yet retain its chicken flavor. This mildness cannot be obtained by merely diluting a strongly-flavored extract. It is inherent in the poultry-flavor itself. It was therefore most unexpected that I found that by blending certain ingredients in the proper amounts, I obtained a commercially-acceptable chicken flavor that serves as a substitute for natural chicken flavor without the addition of spices, or flavor modifiers.

It is known that a flavor such as that of roast beef, boiled beef, roast pork is obtained by reacting a monosaccharide such as hexose or pentose with cystine or cysteine in the presence of water at an elevated temperature. The teachings of Morton, et al., U.S. Pat. No. 2,934,437 are illustrative thereof. I have surprisingly found that by combining a hexose or pentose with water, cystine or cysteine, and a particular amount of glycine, and thereafter neutralizing the mixture and heating at an elevated temperature, I obtain a distinct chicken flavor extract.

SUMMARY OF THE INVENTION

Broadly, this invention is a method for making a chicken-flavored composition which comprises mixing in an aqueous medium a hexose or pentose monosaccharide or mixtures thereof, cysteine or cystine or mixtures thereof, and glycine in an amount to provide from about 0.05 to 0.5 part per part by weight of the total mixture; neutralizing to a pH of about 6.5 to 7.5 and thereafter heating at from about 70° to 100° C. for from about 10 minutes to 4 hours.

Also included is the above-described process where the hexose is dextrose and the pentose is arabinose.

Furthermore, this invention includes the above-described process where the chicken-flavored product is cooled and there is then added from about 0.2 to about 15 parts by weight of edible fat.

Also included in this invention is the method for making a chicken-flavored composition which comprises mixing in an aqueous medium, dextrose, arabinose, cysteine and glycine in an amount to provide from about 0.05 to 0.5 part per part by weight of the total mixture, neutralizing to a pH of about 6.5 to 7.5 and thereafter heating at from about 90° to 100° C. for about 2 hours; cooling and thereafter adding to the chicken-flavored product a. from about 2 to 15 parts by weight of monosodium glutamate,
b. from about 3 to 15 parts by weight of vegetable protein hydrolysate,
c. from about 1 to 4 parts by weight of sucrose, and thereafter heating at from about 70°–75° C. for about 1 to 4 hours.

Furthermore, this invention includes the aforesaid method wherein the chicken flavored composition is cooled and blended with from about 0.2 to 15 parts of edible fat and from about 0.01 to 0.1 part by weight of a 50:50 by weight mixture of disodium inosinate and disodium guanylate, based on the weight of chicken-flavored product and then heating to from about 50° to 55° C. for from about 10 to 30 minutes.

The ingredients of the above-mentioned processes are readily obtainable either commercially, or by synthesis.

The monosaccharides used in this invention may be a pentose or a hexose or mixtures of both. Illustrative pentoses are ribose, arabinose, xylose and the like; illustrative hexoses are glucose, fructose, galactose, mannose and the like.

The term "vegetable protein hydrolysate" as used herein contemplates artificial digests of protein derived by acid, enzymatic or other hydrolysis of vegetable proteins such as the mixture of plant proteins occurring in cereal grains, especially wheat, and known as gluten. The said protein hydrolysates, which are freely available commercially, comprise the constituent amino acids representative of the source protein. A particularly useful hydrolysate is that made by the Nestle Company and sold under the tradename Maggi 3H3 Paste.

The term "physiologically-acceptable salts" as used herein contemplates non-toxic alkali metal, alkaline earth metal and organic base salts of 5'-ribonucleotides, of which inosine-5'-phosphoric acid also well known in the art as inosinic acid, is a member of special importance, and glutamic acid. Particular mention is made of the sodium and calcium salts, which are desirable because of their ready availability and low toxicity. Also important are the potassium salts, the ammonium salts and the salts with glycine and other non-toxic organic bases.

It has been found that, in addition to, or in place of inosinic acid, other 5'-ribonucleotides may be employed in the practice of the instant invention. In this connection, special mention is made of certain 5'-ribonucleotides derivable from a commonly employed source of inosinic acid, namely yeast ribonucleic acid: cytidine-5'-phosphoric acid, uridine-5'-phosphoric acid and guanosine-5'-phosphoric acid; this latter substance commonly is referred to as guanylic acid.

By the term "chicken-flavored product" used herein and in the appended claims is meant the chicken-flavored composition obtained by mixing the hexose or pentose monosaccharide or mixtures thereof, the cysteine or cystine or mixtures thereof, water and glycine; neutralizing to a pH of about 6.5 to 7.5 and thereafter heating at from about 70° to 100° C. for from about 10 minutes to 4 hours.

It is critical to this invention that hexose or pentose monosaccharides or mixture of hexose and pentose, the cystine or cysteine or mixture of cystine or cysteine, and the glycine, be mixed with water and neutralized to a pH of about 6.5 to 7.5 prior to heating at about 70° to 100° C. for from about 10 minutes to 4 hours, in order to obtain a chicken-flavored product. When the glycine is not added or when the mixture is not neutralized a nondescript tasting composition is obtained.

For the practice of this invention when vegetable protein hydrolysate is added, it is important to maintain the ratio of vegetable protein hydrolysate to chicken-flavored product as disclosed herein and as set forth in the appended claims. If more than about 15 parts by weight of hydrolysate per part of chicken-flavored product is used, then the poultry taste is not as pronounced. Also, in the practice of this invention when a 5'-ribonucleotide is added, it is very desirable to maintain the ratio of 5'-ribonucleotide to meat-flavored substance as disclosed herein. If more than 0.1 part by weight of the said nucleotide is present for each part of the chicken-flavored product, the economic advantage of the instant invention is diminished.

As will be exemplified hereinafter, the flavoring compositions are obtained and may be used in the form of substantially dry solids or pastes or in solutions. When the flavoring compositions are used for replacements for poultry extract, a certain amount of adjustment in the concentration may be needed depending on individual preference and the nature of the final product in order to arrive at the most desirable flavor or essence. These adjustments are well within the ability of those skilled in the art and, as is obvious, the need for such adjustments by the consumer is largely obviated by providing a synthetic mixture of this invention with a flavoring strength equivalent to that of poultry extract. Such a composition can readily be made by suitable selection of concentrations and will be exemplified hereinafter.

It will be obvious to those skilled in the art of cookery, that the addition of suitable spices to the chicken-flavored composition prepared by the method of this invention or to foods prepared by utilization of the composition, will result in turkey duck, Cornish hen, goose or pheasant-like tastes depending on the spices used and their amounts.

The instant invention, in one of its embodiments especially useful to prepare chicken-flavored gravy with roast chicken flavor and odor, contemplates the process as described above wherein for each part of the said meat-flavored substance there is provided from about 0.5 to about 15 parts of edible fat.

As will be exemplified, to obtain the aforementioned chicken-flavored product it is necessary to heat the ingredients at from about 70° to 100° C. for a period of from about 10 minutes to 4 hours. As will be obvious to those skilled in the art, the higher the temperature chosen, the shorter the time required to obtain an adequate flavor.

With respect to the edible fat, both animal and vegetable fats may be used. For example, chicken fat and beef fat, margarine, butter and safflower oil, coconut oil and the like, can be employed. While the reactions leading to roast meat odor and flavor are not clearly understood, the heating together of the mixture with fat under these conditions leads to a very pleasing product, different from that obtained when fat is not present.

The amount of edible fat can be varied. Based on the chicken-flavored substance, for example, there can be used from about 0.5 to about 15 parts of fat per part of chicken-flavored product or even more.

DETAILED DESCRIPTION OF THE INVENTION

A specific embodiment of this invention comprises heating in admixture a compound selected from hexose and pentose monosaccharides, or mixtures thereof, and preferably dextrose and arabinose to obtain the optimum in poultry flavor, with cystine or cysteine or mixtures thereof in the presence of water, adding for each part by weight of the mixture, glycine in an amount to provide from about 0.05 to about 0.5 parts by weight. The cystine or cysteine, monosaccharides and glycine are added to the water and the pH is adjusted to an acidity of from about 6.5 to 7.5. The solution is then heated at from about 70° to 100° C. for from 10 minutes to about 4 hours, and preferably from 90°–100° C. for about 2 hours to obtain the best tasting product, cooled to about room temperature and an amount of water about equal to the weight of the mixture is added. The acidity of the mixture is readjusted to pH of from about 6.5 to 7.5 and preferably about 6.5 to 7.0 to obtain the optimum chicken flavor. To the mixture is added from about 2 to about 15 parts by weight of glutamic acid or a physiologically-acceptable salt thereof, for each part of chicken-flavored product. The glutamate salt may be added to the solution prior to neutralizing and heating in order to reduce the amount of alkali required for neutralization. However, in order to obtain a good poultry flavor only about 0.2 part per part of meat-flavored substance should be so used. The remainder being added after neutralizing and heating. To the cooled mixture is added for each part of chicken-flavored product from about 3 to 15 parts by weight of vegetable protein hydrolysate and from about 1 to 14 parts of sucrose. The resulting mixture is heated at 70°–75° C. for about 1 to 4 hours, cooled to about 50° C., and from about 0.2 to about 15 parts of edible fat and from about 0.01 to about 0.1 part of a 5'-ribonucleotide selected from inosinic acid, guanylic acid, mixtures thereof and their physiologically-acceptable salts, for each part by weight of meat-flavored substance, is added. The mixture is stirred for about 15 minutes at 50°–55° C. and bottled. Alternatively, the edible fat may be added prior to heating at 70°–72° C. However, the 5'-ribonucleotide is preferably added after heating to avoid decomposition.

EXAMPLE I

A chicken-flavored composition is formed by adding to a 2-liter, 3-necked flask fitted with a mechanical stirrer, thermometer and reflux condenser, 60 ml. water, 13.0 grams L-cysteine hydrochloride, 6.7 grams glycine hydrochloride, 10.8 grams dextrose and 8.0 grams L-arabinose. After the addition of each ingredient the mixture is stirred to dissolve the ingredient before the next ingredient is added. The total time to prepare this solution is about 30 minutes. The solution is adjusted to pH 7.0 by the addition of about 10 ml. 50 percent aqueous sodium hydroxide. The solution is then heated to about 90°–95° C., for 2 hours. After cooling to 20°–25° C., 100 ml. water is added and the acidity adjusted to pH 6.8 with about 20 ml. 1N sodium hydroxide solution. The resulting composition has a poultry taste and aroma reminiscent of roast chicken. Similar results are obtained when L-cysteine hydrochloride is replaced with L-cysteine, L-cystine, L-cystine hydrochloride or a mixture of L-cysteine and L-cystine.

EXAMPLE II

In a 2-liter, 3-necked flask fitted with mechanical stirrer, thermometer and reflux condenser is added the following ingredients:

| | |
|---|---|
| water | 60 ml. |
| L-cysteine hydrochloride | 13.0 grams |
| glycine hydrochloride | 6.7 grams |
| dextrose | 10.8 grams |
| L-arabinose | 8.0 grams |

The solution is adjusted to pH 7.0 with 10 ml. of 50 percent aqueous sodium hydroxide and is then heated at 90°–95° C. for 2 hours. After cooling to 20°–25° C., 100 ml. of water is added and the acidity is adjusted to pH 6.8 with 1N hydroxide solution. With the stirrer on, the following ingredients are added:

| | |
|---|---|
| sucrose | 166 grams |
| vegetable protein hydrolysate (VPH) | 550 grams |
| monosodium glutamate (MSG) | 530 grams |

The resulting solution is heated at 70°–72° C. for 4 hours. It is then cooled to 50° C. and 45 grams rendered chicken fat and 1.5 grams of a 50/50 mixture of disodium inosinate and disodium guanylate are added with stirring. The product is blended for 15 minutes at 50°–55° C. and packaged in glass bottles. The composition has an excellent chicken flavor and is suitable for flavoring gravies and soups.

EXAMPLE III

Chicken-flavored compositions are prepared by the procedure of Example I, substituting for the dextrose the following hexoses: galactose, mannose and fructose; and for the arabinose the following pentoses: ribose and xylose. Substantially the same results are obtained.

EXAMPLE IV

Chicken-flavored compositions are prepared by the procedure of Example II substituting for the mixture of disodium inosinate and disodium guanylate: dipotassium inosinate, calcium inosinate, diammonium inosinate, inosinic acid or guanylic acid.

Similarly, chicken-flavored compositions are prepared according to the procedure of Example I when glutamic acid, monopotassium glutamate, monocalcium diglutamate and monoammonium glutamate are substituted for monosodium glutamate.

EXAMPLE V

The procedure of Example II is repeated, substituting for the rendered chicken fat, an equal amount of coconut oil. An eminently satisfactory chicken-flavored composition is obtained.

Similarly, when margarine, in an amount equal to the amount of rendered chicken fat in Example II, is substituted for the chicken fat, a chicken gravy base is obtained.

EXAMPLE VI

In a 2-liter, 3-necked flask fitted with mechanical stirrer, thermometer, and reflux condenser is added the following ingredients:

| | |
|---|---|
| water | 60 ml. |
| L-cysteine hydrochloride | 13.0 grams |
| glycine hydrochloride | 6.7 grams |
| dextrose | 10.8 grams |
| L-arabinose | 8.0 grams |
| monosodium glutamate | 17.0 grams |

The solution is adjusted to pH 7.0 with 50 percent aqueous sodium hydroxide and then is heated at 90°–95° C. for about 2 hours. After cooling to 20°–25° C., 100 ml. of water is added and the acidity is adjusted to pH 6.8 with 1N sodium hydroxide solution. With the stirrer on, the following ingredients are added:

| | |
|---|---|
| sucrose | 166 grams |
| vegetable protein hydrolysate | 550 grams |
| monosodium glutamate | 513 grams |

The resulting solution is heated at 70°–72° C. for 4 hours. It is then cooled to 50° C. and 45 grams coconut oil and 1.5 grams of a 50/50 mixture of disodium inosinate and disodium guanylate are added with stirring. The product is blended for 15 minutes at 50°–55° C. and packaged. The resulting composition is an excellent chicken gravy or chicken soup base. Similarly, when the 45 grams coconut oil are added prior to heating at 70°–72° C., an excellent chicken-flavored composition is obtained.

EXAMPLE VII

When the procedure of Example II is repeated, substituting different proportions of certain ingredients as set forth in Table I, satisfactory chicken-flavored compositions are obtained.

TABLE I

| Glycine | Sucrose | VPH[1] | MSG[2] | 5'-Ribo.[3] | Fat |
|---|---|---|---|---|---|
| 5 | 102 | 305 | 203 | 1 | 20 |
| 5 | 203 | 305 | 203 | 1 | 20 |
| 5 | 203 | 305 | 509 | 2 | 20 |
| 7 | 203 | 407 | 509 | 2 | 40 |
| 7 | 203 | 509 | 509 | 2 | 50 |
| 7 | 203 | 611 | 509 | 2 | 50 |
| 10 | 407 | 611 | 1527 | 2 | 50 |
| 10 | 407 | 611 | 1527 | 5 | 100 |
| 51 | 407 | 1018 | 1527 | 5 | 1527 |
| 51 | 407 | 1527 | 1018 | 10 | 102 |
| 5 | 0 | 611 | 0 | 2 | 0 |
| 5 | 203 | 611 | 509 | 2 | 0 |
| 5 | 203 | 611 | 509 | 0 | 50 |
| 5 | 203 | 0 | 509 | 2 | 50 |
| 5 | 0 | 611 | 509 | 2 | 50 |
| 10 | 203 | 814 | 0 | 5 | 10 |
| 5 | 203 | 611 | 509 | 1 | 40 |

(1) Vegetable protein hydrolysate
(2) Monosodium glutamate
(3) 5'-Ribonucleotides, a 50:50 by weight mixture of disodium inosinate and disodium guanylate.

EXAMPLE VIII

To a 2-liter, 3-necked flask fitted with a mechanical stirrer, thermometer and reflux condenser, are added 60 ml. water, 6.0 grams L-cysteine hydrochloride and 7.0 grams L-cystine hydrochloride, 6.7 grams glycine hydrochloride, 10.8 grams dextrose and 8.0 grams arabinose and the mixture is stirred after the addition of each ingredient. The solution is adjusted to pH 7.5 by the addition of about 10 ml. of 50 percent aqueous sodium hydroxide. The solution is then heated at 100° C. for about 10 minutes. After cooling to 20°–25° C., 100 ml. water is added and the acidity is adjusted to pH 7.5 with 1N aqueous sodium hydroxide. The resulting composition has a chicken taste and aroma.

Similarly, when the ingredients of the chicken flavored product are neutralized to a pH of 6.5 rather than 7.5 and the solution is heated at 70° C. for 4 hours, a chicken flavored product is obtained.

What is claimed is:

1. A method for making a chicken-flavored composition which consists essentially of mixing in an aqueous medium a hexose or pentose monosaccharide or mixtures thereof, cystine or cysteine or mixtures thereof, and glycine in an amount to provide from about 0.05 to about 0.5 part per part by weight of the total mixture; neutralizing to a pH of about 6.5 to 7.5 and thereafter heating at from about 70° C. to 100° C. for from about 10 minutes to 4 hours.

2. The method of claim 1 wherein said hexose is dextrose and said pentose is arabinose.

3. The method of claim 1 wherein the chicken-flavored product is cooled and there is then added from about 0.2 to about 15 parts by weight of edible fat.

4. A method for making a chicken-flavored composition which consists essentially of mixing in an aqueous medium, dextrose, arabinose, cysteine, and glycine in an amount to provide from about 0.05 to 0.5 part per part by weight of the total mixture; neutralizing to a pH of about 6.5 to 7.5 and thereafter heating at from about 90° to 100° C. for about 2 hours, cooling and thereafter adding to the chicken-flavored product
   a. from about 2 to 15 parts by weight of monosodium glutamate,
   b. from about 3 to 15 parts by weight of vegetable protein hydrolysate,
   c. from about 1 to 4 parts by weight of sucrose, and thereafter heating to about 70° to 75° C. for about 1 to 4 hours.

5. The method of claim 4 wherein the chicken-flavored composition is cooled and blended with from about 0.2 to about 15 parts of edible fat and from about 0.01 to 0.1 part by weight of a 50:50 by weight mixture of disodium inosinate and disodium guanylate, based on the weight of chicken-flavored product and then heating to from about 50°–55° C. for from about 10 to 30 minutes.

* * * * *